W. A. ANDREW.
ADJUSTABLE GAMBREL.
APPLICATION FILED JULY 7, 1919.

1,345,112. Patented June 29, 1920.

WITNESSES

Inventor
WILBUR A. ANDREW

Attorney

UNITED STATES PATENT OFFICE.

WILBUR A. ANDREW, OF EVANSVILLE, WISCONSIN.

ADJUSTABLE GAMBREL.

1,345,112.  Specification of Letters Patent.  Patented June 29, 1920.

Application filed July 7, 1919. Serial No. 309,033.

*To all whom it may concern:*

Be it known that I, WILBUR A. ANDREW, a citizen of the United States, residing at Evansville, in the county of Rock and State of Wisconsin, have invented certain new and useful Improvements in Adjustable Gambrels, of which the following is a specification.

This invention relates to gambrels and has for its principal object the production of a device of this nature which is adapted to efficiently support carcasses of various sizes.

Another object of this invention is the production of an adjustable gambrel wherein the supporting hooks are carried upon the bar, one of the hooks being capable of very easy and quick adjustment to meet the needs of the circumstances.

Another object of this invention is the production of an adjustable gambrel wherein the movable hook is provided with a pawl engaging notches in a rack bar so that the adjustable hook will be retained in an adjusted position along the rack bar, thus causing the hooks to be spaced apart at a desired distance as the circumstances may require.

One practical form of construction and assembly of the present invention will be hereinafter described, and is illustrated in the drawing, in which—

Figure 1:
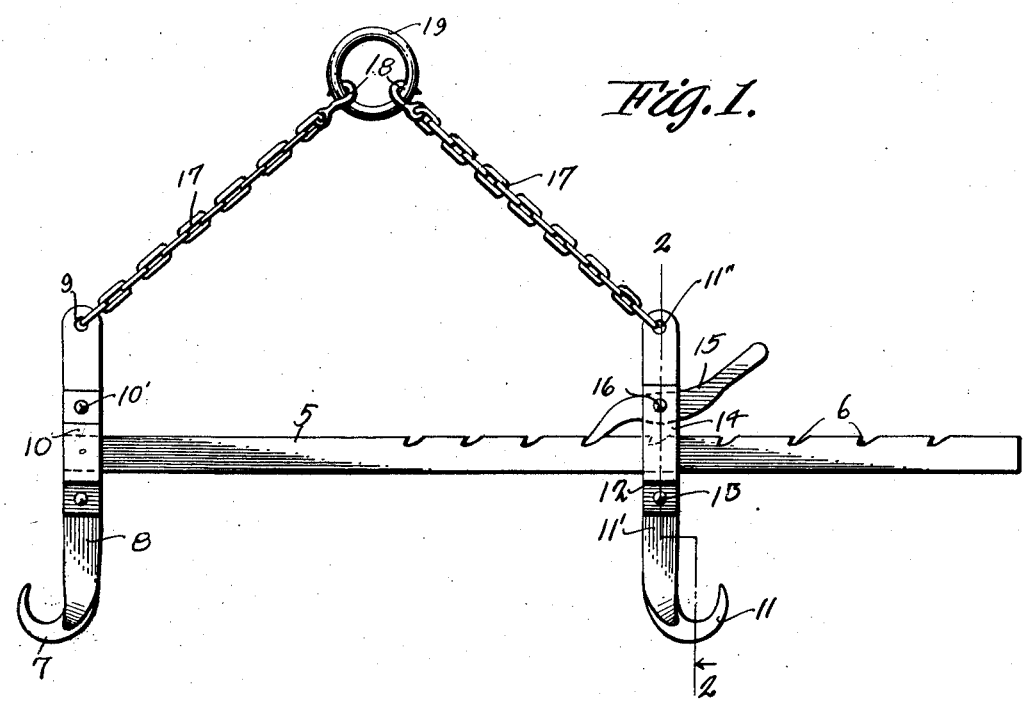
Figure 1 is a side elevation of the adjustable gambrel.
Figure 2:
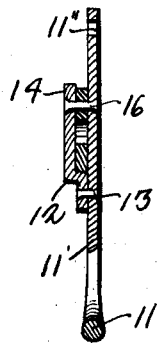
Fig. 2 is a vertical section taken on the line 2—2 of Fig. 1.

In the preferred embodiment of the present invention about to be specifically described, 5 designates the rack bar. This rack bar is of an elongated construction and as illustrated in Fig. 2 is rectangular in cross section although it may be of any desired shape without departing from the spirit of the present invention. This rack bar has a plurality of notches 6 in its upper edge as shown.

The fixed hook 7 has a vertical elongated body 8 provided with an opening 9 in its upper end. A conventional form of clamp 10 is fixed as shown at 10' upon the body 8 of the hook 7 and is also fixed in any desired manner upon one end of the rack bar 5, thus fixing the hook 7 at one end of the rack bar.

The remaining hook 11 has a vertical body 11' extending upon one side of the rack bar 5, while a bracket 12 has its lower end fixed as shown at 13 upon the body 11' of the hook 11. This bracket 12 has its outer leaf spaced away from the body of the hook 11 as shown at 14 and for this reason this bracket passes around upon the opposite side of the rack bar 5. An elongated pawl 15 is pivoted as shown at 16 to the bracket 12 and the body 11', above the rack bar 5. It will be noted that the pawl 15 is pivoted intermediate its ends so that it extends for a considerable distance upon each side of the body 11'. The lower end of this pawl 15 is adapted to be received within one of the notches 6 for holding the body 11' from accidentally moving along the rack bar 5 in one direction. It will be noted that the upper end of the body 11' is provided with an opening 11'' therein as shown in Fig. 2.

Chains 17 are connected to the bodies 8 and 11' within the openings 9 and 11', while the upper ends of these chains have hooks 18 carried by the ring 19.

When the device is in use, the ring 19 may be supported upon any suitable supporting means such as a fixed hook and thus the gambrel will be supported. If a small carcass such for instance as that of the calf is to be supported by the device, the upper outer end of the pawl 15 is swung downwardly, thus lifting the lower end from engagement with the rack bar. The body 11' may then be moved along the rack bar 5 toward the body 8. When the bodies are at a desired distance apart, the pawl may then be released and it will fit within a selected notch 6, thus holding the body 11' from further movement toward the body 8. Therefore, the hooks 7 and 11 are carried at a desired distance apart whereby a small carcass may be placed upon the hook and be efficiently supported.

If however it be desired to support a large carcass such for instance as that of a beef upon the gambrel, the body 11' may be moved toward the outer end of the rack bar 5 and away from the body 8. The pawl will ride over the notches and then when movement of the body is stopped will be received within an outer notch, as will be apparent. The large carcass may then be positioned upon the hooks 7 and 11 in the usual manner and will be efficiently supported, for owing to the flexible connection of the chains 17 to the upper ends of the bodies of the hooks, it is obvious that a central support will be provided for the gambrel irrespective of the manner of adjusting the body 11'.

Therefore, a very simple and efficient gambrel has been produced which may be employed for supporting carcasses of various sizes while it may be easily and quickly adjusted for accomplishing this function. It will further be understood that the device being of a very simple construction will minimize the possibility of injury when in use, while the very simplicity of construction will also minimize the cost of production thereof.

The foregoing description and the drawing has reference to the preferred or approved embodiment of my invention. It is to be understood however, that I may make such changes in construction and assembly of parts, materials, dimensions, etc., as may prove expedient and fall within the scope of the appended claim.

Having thus fully described my invention what I claim as new and desire to secure by Letters Patent is:—

In a device of the class described, the combination of an elongated bar having notches in its upper edge, a hook having an elongated body provided with an eye in its upper end, a clamp for fixedly attaching said hook to one end of said bar, a second hook of similar construction to said first mentioned hook, a bracket fixed upon the body of said second hook, a pawl pivotally mounted between the upper end of said bracket and said body, said pawl engaging the notched surface of said bar for adjustably holding said body in a desired position upon the bar, and supporting means connected to the upper ends of said bodies.

In testimony whereof I affix my signature in presence of two witnesses.

WILBUR A. ANDREW.

Witnesses:
B. W. SNYDER,
W. B. ANDREW.